N. Jenkins.
Carriage Spring.
№ 29,598. Patented Aug. 14, 1860.
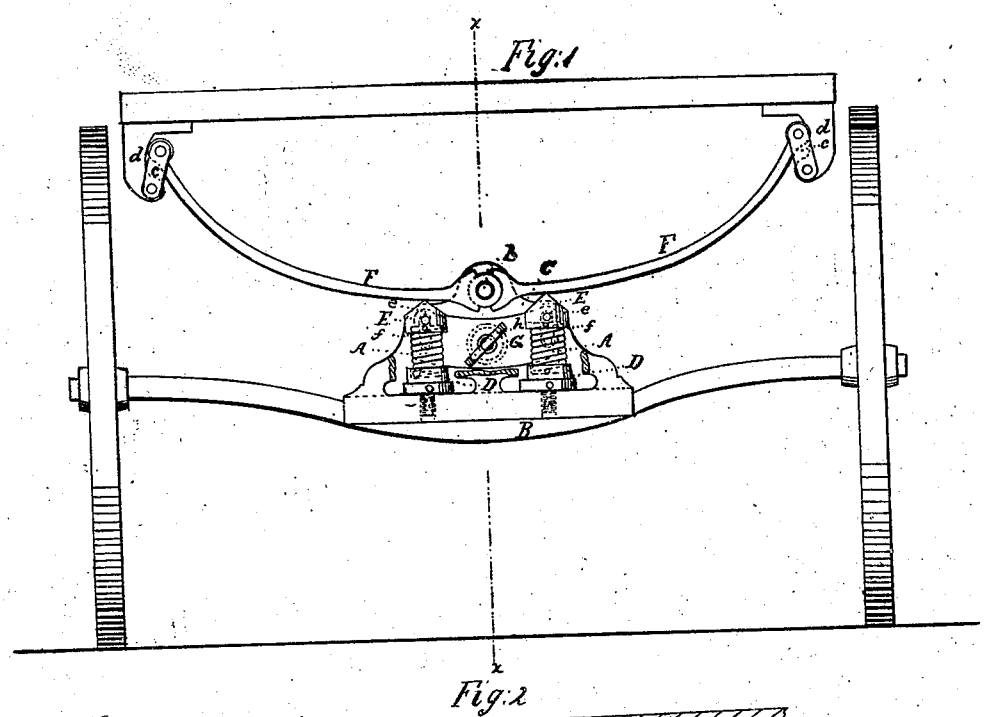
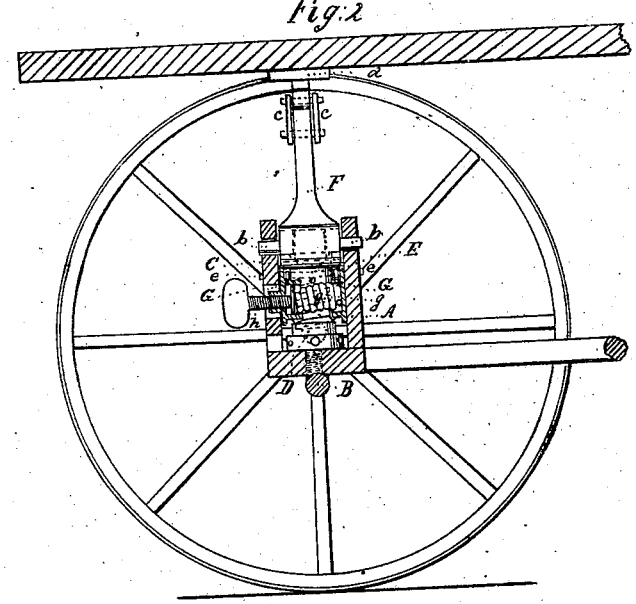
Witnesses
L. W. Beudré
Inventor
Nicholas Jenkins

UNITED STATES PATENT OFFICE.

NICHOLAS JENKINS, OF NEW YORK, N. Y.

WAGON-SPRING.

Specification of Letters Patent No. 29,598, dated August 14, 1860.

*To all whom it may concern:*

Be it known that I, NICHOLAS JENKINS, of the city, county, and State of New York, have invented a new and Improved Wagon-Spring; and I do hereby declare that the following is a full, clear, and exact description of the same, reference being had to the accompanying drawing, forming a part of this specification, in which—

Figure 1 represents a rear elevation of a wagon with my invention. Fig. 2 is a transverse vertical section of the same, the line $x, x$, Fig. 1, indicating the plane of section.

Similar letters of reference in both figures indicate corresponding parts.

The object of this invention, is to obtain a comparatively large motion with small springs, and the invention consists first, in combining the springs with friction plates and set screws in such a manner that their action can be regulated according to the load on the wagon; second, in arranging each spring with a separate tension nut so that its action can be regulated, and that its tension can be increased if the load in the wagon requires it.

To enable those skilled in the art to make and use my invention I will proceed to describe its construction and operation with reference to the drawings.

The springs A, A, are secured to the axle B, and they are guided and kept in the proper position by means of screws $a$, which are rigidly fastened to the bottom of the casing C, which contains the springs. Each spring rests in a cup-shaped nut D, which screws on the screw $a$. By turning this nut in the proper direction the spring is crowded up and its tension is increased. The heads E, of the springs are made in the form of knife-edges and they form the supports or fulcra for arms F, the short ends of which are fastened to the casing C, by means of pivots $b$, whereas their long ends are connected to the platform or to the body of the wagon. This connection may be effected by means of links $c$, and brackets $d$, or in any other desirable manner. By these means the long ends of the arms are free to pass through a comparativly large arc with quite a limited motion of the springs. The heads of the springs are guided by pins $e$, which move up and down in slots $f$, in the friction plates G, that are placed close up to the side plates of the casing C. These friction plates are forced apart and against the sides of the casing by means of a spring $g$, the tension of which is regulated by a set screw $h$. By decreasing the tension of the spring $g$, the action of the springs A, A, is made free and unobstructed and by increasing the tension of the spring $g$ the action of the springs A, A, is made slow. If the load be divided unequally over the platform or body of the wagon, those springs which have to support the heaviest part of the load are crowded up by means of nuts D, until the platform is level, and if a heavy load is placed on the platform, the spring $g$ is tightened up and the action of the springs A, A, is thereby made slower.

It is obvious that two pairs of springs, and two pairs of arms might be arranged on each end of the platform and that the springs might be fastened to the platform instead of to the axle but the action of each spring combined with its arm will be in every case the same as above described.

Having thus described my invention, what I claim as new, and desire to secure by Letters Patent, is—

The combination with the springs A, A, of friction plates G, springs $g$, and set screws $h$, constructed and operating substantially as and for the purpose described.

NICHOLAS JENKINS.

Witnesses:
L. W. BENDRÉ,
M. M. LIVINGSTON.